No. 890,855. PATENTED JUNE 16, 1908.
W. S. HADAWAY, Jr.
CULINARY APPARATUS.
APPLICATION FILED JULY 5, 1907.
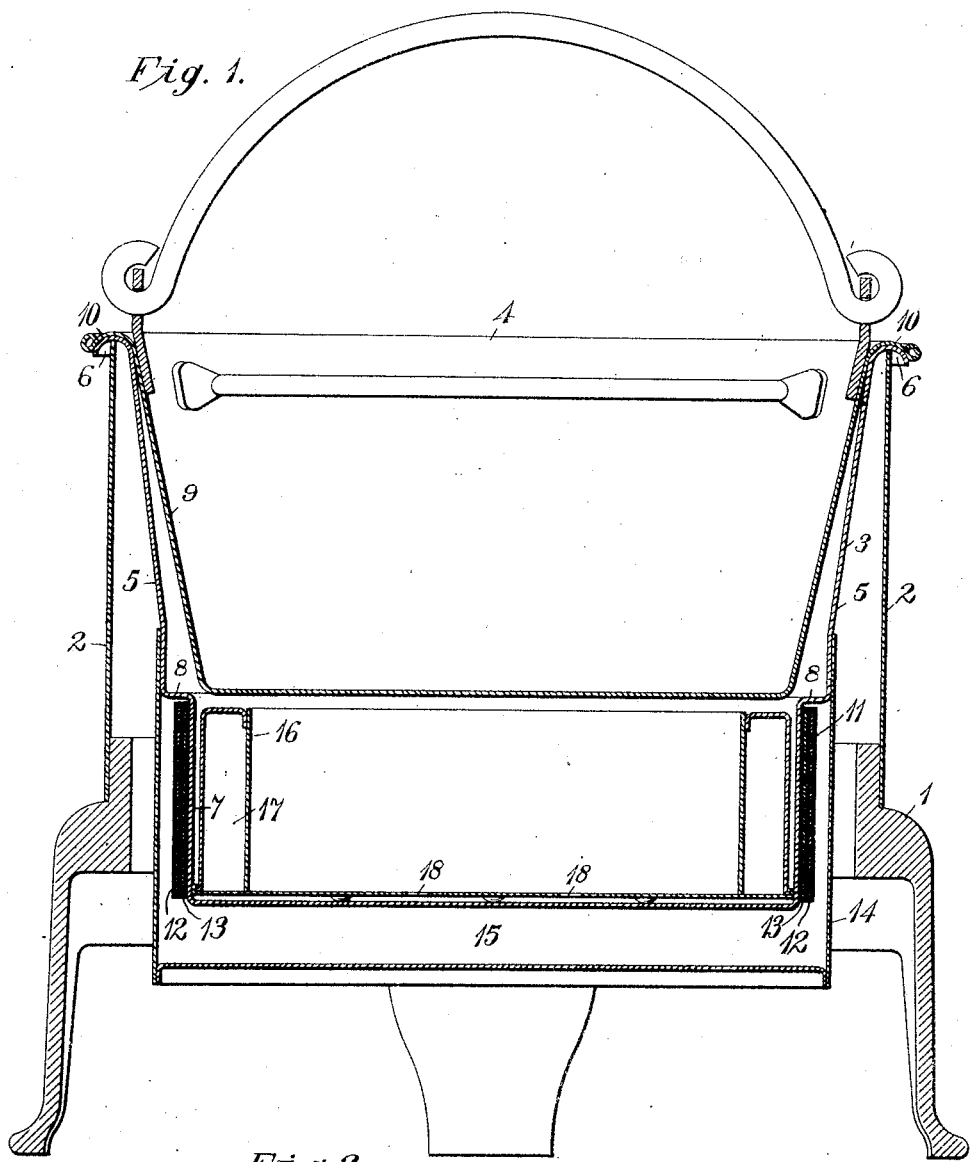
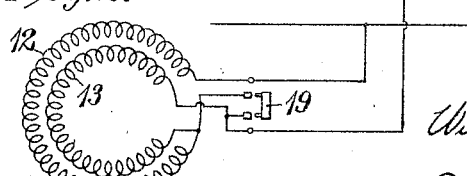
WITNESSES: INVENTOR
Fred H. Miller William S. Hadaway Jr.
BY
ATTORNEY

UNITED STATES PATENT OFFICE.

WILLIAM S. HADAWAY, JR., OF EAST ORANGE, NEW JERSEY, ASSIGNOR TO HADAWAY ELECTRIC HEATING & ENGINEERING CO., A CORPORATION OF NEW YORK.

CULINARY APPARATUS.

No. 890,855.      Specification of Letters Patent.      Patented June 16, 1908.

Application filed July 5, 1907. Serial No. 382,394.

To all whom it may concern:

Be it known that I, WILLIAM S. HADAWAY, Jr., a citizen of the United States, and a resident of East Orange, in the county of Essex and State of New Jersey, have invented a new and useful Improvement in Culinary Apparatus, of which the following is a specification.

My invention relates to culinary apparatus and similar devices and has special reference to electrically heated fluid-containing vessels.

The object of my invention is to provide improved means for rapidly and economically heating water or other liquid in double boilers, glue pots and like apparatus.

A glue pot, as usually constructed, is provided with an outer jacket or vessel in which water is contained and to which heat is applied so that the glue, which is contained in an inner receptacle or pot, may not be injured by the direct application of dry heat to the walls of the receptacle.

Devices of this class are employed for various other purposes and my present invention is not restricted to any specific application.

Figure 1, of the accompanying drawings, is a sectional elevation of a device constructed in accordance with my invention and Fig. 2 is a diagrammatic view of the circuit connections for the electric heater shown in Fig. 1.

The device illustrated is specially adapted for use as a glue pot and, for convenience, it will be hereinafter so designated. By a single arrangement and combination of parts I have produced a device which may contain a relatively large volume of water so that the possibilities of overheating the device are minimized and at the same time a small portion of the water is quickly heated to a high temperature and carried against the walls of the inner vessel in the form of steam, so that the primary object of the heater is accomplished at the earliest possible moment.

Referring to the drawings, the glue pot here illustrated comprises a base 1 of cast iron or other suitable material, a cylindrical jacket 2 secured to the base 1, a fluid-containing vessel 3 and an inner receptacle or pot 4. The fluid-containing vessel 3 has upwardly flaring walls 5 which culminate in a flange 6 that engages the upper edge of the jacket 2. The bottom of the vessel is extended to form a substantially cylindrical projection 7 which is joined to the side walls 5 by a shoulder 8 and forms a water reservoir. The inner receptacle or pot 4 is also provided with upwardly flaring side walls 9 which culminate in a flange or rim 10 that fits over and is supported by the flange 6 on the vessel 3. The side walls of the inner receptacle 4 are more flaring than those of the vessel 3 and its bottom is at substantially the same elevation as the shoulder 8 of the said vessel. In this way, an annular steam chamber is provided between the walls of the two receptacles and a relatively large water reservoir is provided below the inner receptacle.

An electric heating device 11 comprises a pair of heating coils 12 and 13 that surround the cylindrical projection 7 and are insulated from it and from each other. In order that the heat generated in the coils 12 and 13 may substantially all be conducted through the projection 7 into the water, a drum or closed cylinder 14 is fitted over the lower end of the vessel 3 and depends therefrom a sufficient distance to provide an annular air chamber 15. The air, in the chamber 15 will, of course, be heated but the radiation of heat will be inconsiderable because air circulation is impossible and a stationary body of air is a poor heat conductor.

If the entire volume of the water contained in the reservoir formed by the cylindrical projection 7 were permitted to circulate freely, very little useful work would be accomplished in the inner receptacle 4 until all the water had been raised to the boiling point. In order to avoid this delay, I provide a separator 16 which comprises a sealed annular chamber 17, containing air or some other heat insulating matter, the outer wall of which is substantially cylindrical and is of a slightly smaller diameter than the inside diameter of the projection 7 within which it is located. In order that the chamber 17 and the projection 7 may be concentrically located, the bottom of the former is extended outwardly to fit the latter.

It will of course be understood that the circulation of water between the projection 7 and the chamber 17 is not entirely prevented and that the amount of water in the said space is so small that it will be readily and quickly heated to the evaporating point. The separator will usually assume the form of a cylindrical dish having one or more small openings 18 in its bottom, and its chamber 17 will constitute a heat-insulating barrier between the thin film of water adjacent to the heated walls of the chamber 7 and the main body of water.

The circuit connections for the electric heating coils may, of course, be varied to suit existing conditions, a convenient arrangement being illustrated in Fig. 2 in which a single coil of the heater is first connected directly across the circuit so that a high heat is applied for the first step in the process, such as melting the glue, and a second coil is afterward connected in series with the first for applying a low or running heat which is sufficient to keep the glue in a molten state. These circuit changes are accomplished by a jumper 19 which may be replaced by any other suitable switching device.

Energy may be applied to the heating coils from either an alternating or a direct current source so long as the resistance of the coils and the voltage of the line are properly related to each other. The receptacles 3 and 4 and the separator 16 are preferably constructed of spun or stamped copper. The heating coil to which energy is applied initially should be secured directly to the projection 7 and the other coil, which is in service under normal operating conditions, may advantageously be bound over the first coil.

The coils themselves may be constructed in various ways but it is believed that the best results will be secured by the use of ribbon resistance strips wound helically about the outer surface of the chamber and insulated therefrom by mica or other heat-resisting insulation.

I claim as my invention:

1. The combination with a fluid-containing vessel, and external means for imparting heat thereto, of a heat-insulating barrier located within the vessel for determining the fluid circulation.

2. The combination with a fluid-containing vessel, and external means for imparting heat thereto, of an air-tight annular chamber located within the vessel and dividing the fluid so as to determine its circulation.

3. The combination with a fluid-containing vessel and external means for imparting heat to the side walls of the vessel near its bottom, of an air-tight annular chamber located within the vessel adjacent to the heated walls and slightly removed therefrom, said chamber dividing the liquid so as to determine its circulation.

4. The combination with an inner receptacle, a fluid-containing vessel in which the receptacle is suspended, an external means for imparting heat to the vessel, of means for dividing the liquid to produce a relatively thin film adjacent to the heated wall of the vessel.

5. The combination with an inner receptacle, a fluid-containing vessel of materially greater depth than the inner receptacle and in which the latter is suspended, thereby producing a reservoir at the bottom of the fluid-containing vessel, and an external means for imparting heat to the vessel, of means for so dividing the liquid in the reservoir as to produce a thin film adjacent to its heated wall.

6. The combination with an inner receptacle, a fluid-containing vessel in which the receptacle is suspended, and an external means for imparting heat to the vessel, of a heat-insulating partition slightly separated from the heated wall of the vessel for dividing the liquid to produce a relatively thin film adjacent to said wall.

7. The combination with an inner receptacle, and a fluid-containing vessel of materially greater depth than the inner receptacle and in which the latter is suspended, thereby producing a reservoir at the bottom of the fluid-containing vessel, of a heat-insulating partition that is slightly separated from the heated wall of the vessel for so dividing the liquid in the reservoir as to produce a thin film adjacent to said wall.

8. The combination with an inner receptacle, a fluid-containing vessel in which the receptacle is suspended, and an external means for imparting heat to the vessel, of an annular chamber filled with heat insulating matter and located within the vessel and slightly separated from its side walls for dividing the liquid to produce a relatively thin film adjacent to said walls.

9. The combination with an inner receptacle, and a fluid-containing vessel of materially greater depth than the inner receptacle and in which the latter is suspended, thereby producing a reservoir at the bottom of the fluid-containing vessel, of an air-tight annular chamber within the vessel and slightly separated from its side walls for so dividing the liquid in the reservoir as to produce a thin film adjacent to said walls.

10. The combination with a fluid-containing vessel of relatively thin heat conducting material and an electric heating device secured to an outer wall of the vessel, of means for dividing the liquid to produce a relatively thin film adjacent to the heated wall of the vessel.

11. The combination with a fluid-containing vessel of relatively thin heat-conducting material and an electric heating device secured to the outer side walls of the vessel, of an annular chamber filled with heat insulating matter and located within the vessel and slightly separated from its side walls, for dividing the liquid to produce a relatively thin film adjacent to said walls.

12. The combination with a fluid-containing vessel of relatively thin heat-conducting material and an electric heating device secured to the side walls of the vessel, of an air-tight annular chamber within the vessel and slightly separated from its side walls for dividing the liquid to produce a relatively thin film adjacent to said walls.

13. The combination with a fluid-containing vessel having relatively thin walls of heat-conducting material, a second vessel suspended within the first and an electric heating device secured to an outer wall of the fluid-containing vessel, of means for so dividing the liquid in the reservoir as to produce a thin film adjacent to its heated wall.

14. The combination with a fluid-containing vessel having relatively thin walls of heat-conducting material, a second vessel suspended within the first and an electric heating device secured to the side walls of the fluid-containing vessel, of an annular chamber filled with heat-insulating matter and located within the vessel and slightly separated from its side walls for so dividing the liquid in the reservoir as to produce a thin film adjacent to said walls.

15. The combination with a fluid-containing vessel having relatively thin walls of heat-insulating material, a second vessel suspended within the first and an electric heating device secured to an outer wall of the fluid-containing vessel, of an air-tight annular chamber within the vessel and slightly separated from said outer wall for so dividing the liquid in the reservoir as to produce a thin film adjacent to said wall.

In testimony whereof, I have hereunto subscribed my name this 29th day of June, 1907.

WILLIAM S. HADAWAY, JR.

Witnesses:
  WM. H. CAPEL,
  F. LOWENHAUPT.